Jan. 12, 1965
B. A. BUSS
3,165,003
LAUNDRY MACHINES
Filed Nov. 8, 1961
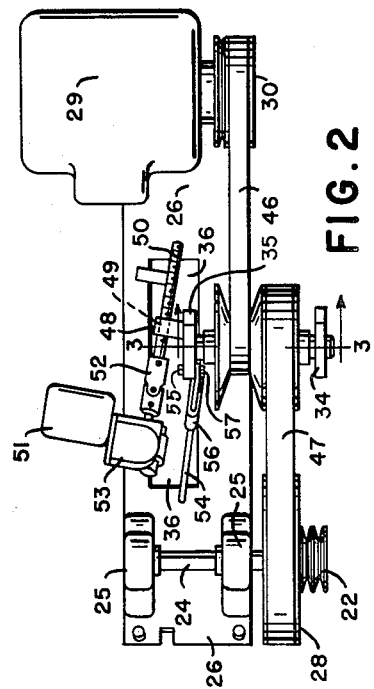
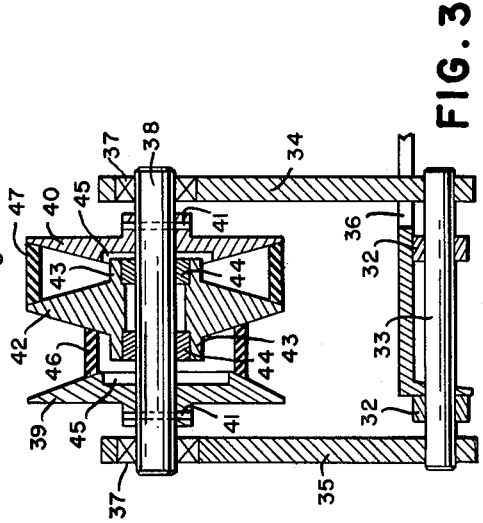
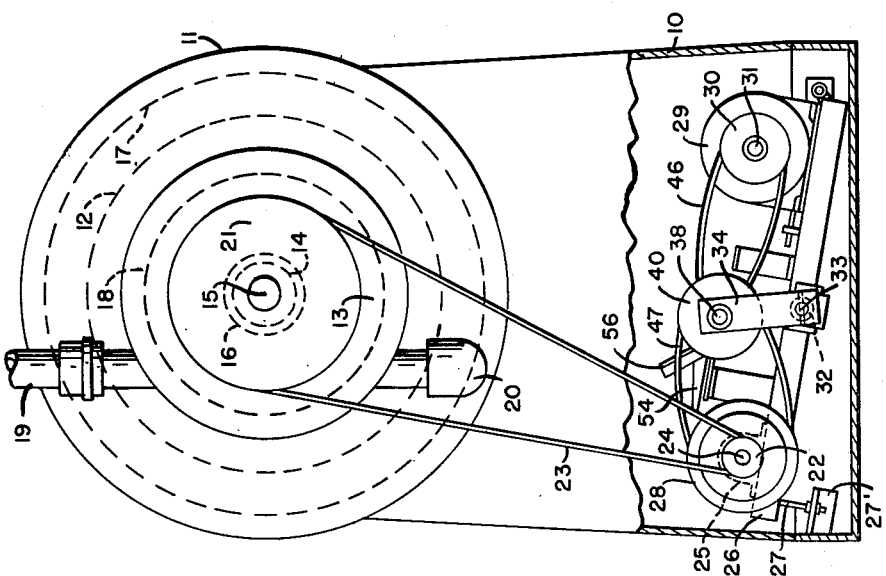
INVENTOR.
BENJAMIN ALVIN BUSS
BY
Robertson my Smythe
ATTORNEYS.

United States Patent Office

3,165,003
Patented Jan. 12, 1965

3,165,003
LAUNDRY MACHINES
Benjamin Alvin Buss, East Moline, Ill., assignor to
Ametek, Inc., a corporation of Delaware
Filed Nov. 8, 1961, Ser. No. 150,994
6 Claims. (Cl. 74—230.17)

The present invention relates to variable speed belt drives for laundry machines and the like, and particularly to a new and improved variable speed belt drive of the type including an oscillatable arm that supports differential V-belt sheave means between input and output spaced fixed diameter V-belt sheaves.

In laundry machines, particularly those involving heavy drives, serious problems arise due to the generation of heat within the belts. This excessive heat causes breakdown of the belt structure, excessive stretching of the belts, and lubrication problems.

Additionally, in such differential variable speed V-belt pulley drives, problems arise in maintaining the longitudinal centerline of the belts within the same plane throughout the adjustment of the differential V-belt sheave means on the oscillatable arm.

The principal object of this invention is to provide a variable speed belt drive that will rotate a clothes container of a laundry machine or the like throughout a desired range of speeds without developing excessive temperatures within the belt.

Another object of the invention is to provide a variable speed belt drive in which different width belts are employed between a differential pulley arrangement and the power input on the one hand, and the power output on the other hand.

In one aspect of the invention, a clothes container of a laundry machine may be mounted within a frame for rotation about a horizontal axis. This container may be of usual form having a door aligned with the axis of rotation of the container and the usual water inlet and drains that are common to such laundry machines. A variable speed belt drive may be provided for rotating the clothes container, and it may be mounted on a base that is rigidly attached to the main frame. There may be an electric motor mounted at one end of the base having a fixed diameter V-groove pulley on its output shaft. There also may be a fixed diameter V-groove pulley system at the opposite end of the base. Between the two ends of the base may be located a pivotally mounted arm means supporting a differential V-groove pulley system that is belted to the motor pulley and to the pulley system at the other end of the base. The expansible pulley system may include two opposed conical flanges fixed in spaced relation to a shaft that is rotatably mounted within ball bearings in the pivotally mounted arm means. Between the two flanges may be an oppositely disposed double conical surfaced element mounted on the shaft so that it may move toward and away from the opposed fixed conical flanges. The conical surfaces of the element form V-grooves with the respective fixed conical flanges.

In another aspect of the invention, the pivotally mounted arm means may include aligned arms fixed to a shaft that is mounted for axial movement in nylon bearings or the like on the main support for the variable speed drive.

In still another aspect of the invention, the expansible pulley system may include a nut fixed to the oscillatable arm means and threaded onto a screw that is connected by a universal joint to a motor mounted on the main support for oscillating the arm means to vary the output speed thereof.

In still another aspect of the invention, a relatively narrow belt between the motor pulley and the expansible pulley system is employed and it is not excessively worked to a point causing excessive internal heat because the linear speed of the belt is relatively high, requiring a relatively low torque to produce the necessary power. On the other hand, at the slow speed range of the system, employing a belt of relatively narrow width between the expansible pulley system and the output pulley would cause excessive internal working that would produce excessive internal heating which would cause rapid deterioration of the belt. This latter is caused by the relatively low linear speed of the belt requiring the development of a relatively large torque to produce the necessary power. Accordingly, the belt between the expansible pulley system and the fixed diameter output pulley is wider than the other belt in order to develop the required high torque without damaging the belt structure.

The above, other objects and novel features of the invention will become apparent from the following specification and accompanying drawings which are merely exemplary.

In the drawings:

FIG. 1 is a back elevational view of a laundry machine to which the principles of the invention have been applied;

FIG. 2 is a top plan view of the apparatus; and

FIG. 3 is a view looking along line 3—3 of FIG. 2.

Referring to the drawings, and particularly to FIG. 1, the principles of the invention are shown as applied to a laundry machine including a frame 10 having a cylindrical housing 11. The housing 11 may be provided with the usual pivotally mounted door 12. The frame 10 may include a bracket 13 that supports a bearing 14 in axial alignment with the cylindrical housing 11.

A shaft 15 may be journaled in bearing 14 and its one end may extend through seals 16 formed in the wall of housing 11 opposite that containing the door 12. A cylindrical clothes container 17 may be attached to shaft 15 within housing 11, and it may include an open mouth portion 18 axially aligned with, and adjacent to the door 12. The usual inlet 19 and drain 20 may be provided for the machine.

The shaft 15 may have a constant diameter V-groove pulley 21 fixed to its end opposite that supporting container 17. Pulley 21 is connected to a constant diameter V-groove pulley 22 through V-belts 23. The pulley 22 is fixed to a shaft 24 that is journaled in bearings 25 mounted at one end of a base made from a wide channel member 26. The base 26 at one end, may be attached to threaded rods 27 that are connected to a bracket 27' so that base 26 is angularly disposed with respect to the bottom of the frame 10.

The shaft 24 may fixedly support another V-groove pulley 28 of relatively large and constant diameter adjacent to the pulley 22. An electric motor 29 may be adjustably fixed to the end of base 26 opposite that supporting bearings 25, and it may have a relatively small, fixed diameter V-groove pulley 30 keyed to its output shaft 31. Intermediate the motor 29 and the bearings 25, and attached to the channel member 26 may be aligned journal bearings 32 rotatably and axially slidably supporting a shaft 33. Preferably, the bearings 32 are made from a plastic such as that sold under the trade name Nylon. An arm 34 may be fixed to shaft 33 at its one end and another arm 35, aligned with arm 34, may be fixed to the opposite end of shaft 33. The latter arm 35 may extend upwardly through an opening 36 within the channel member 26.

Near the upper end of arms 34 and 35 aligned ball bearings 37 may be located for journaling a shaft 38. Oppositely facing, conical-faced pulley elements 39 and 40 may be fixed to shaft 38 by pins 41. Between the elements 39 and 40 may be journaled and axially movable, a double oppositely-faced conical member 42. The member 42 may include hubs 43 that are bored to receive plastic bearings 44 for rotatably and axially slidably receiving shaft 38. The elements 39 and 40 may include bored recesses 45 for receiving the hubs 43 when member 42 is axially moved along shaft 38. The elements 39, 40 and 42 form the differential pulley means previously referred to.

A relatively narrow V-belt 46 may be connected between the relatively small, fixed diameter pulley 30 on shaft 31 of motor 29 and the V-pulley formed by element 39 and member 42. A relatively wide V-belt 47 may be connected between the relatively large, fixed diameter pulley 28 on shaft 24 and the V-pulley formed by element 40 and member 42. The linear speed of the relatively narrow belt 46 that connects pulley 30 on motor shaft 31 is always high due to the normal rotative speed of motor 29 which may be 1750 r.p.m. or thereabout. Accordingly, the power requirements are produced by belt 46 at relatively moderate torques so that stretching, flexing and heating under excessive torques are not encountered. However, if belt 47 were of the same narrow width as belt 46, it would be subjected to excessive torque at the low speed end of the range of output speeds due to the relatively low linear speed of belt 47. The relatively wide belt 47, when subjected to the relatively high torques at low output speed of the system, does not overheat internally, stretch or deteriorate in use.

In order to vary the speed of rotation of shaft 24 for varying the speed of rotation of the basket 17, the arms 34, 35 are adapted to be oscillated about shaft 33. While the location of shaft 33 may be such that the tension of the belts 46 and 47 remain substantially constant throughout the range of speed adjustment, it is preferred that the axis of rotation of shaft 33 be located in the manner shown, described and claimed in application Serial No. 39,102, filed June 27, 1960, in the name of Benjamin Alvin Buss, now Patent No. 3,068,677. In order to oscillate arms 34, 35 about the axis of shaft 33, a bracket 48 may be provided with a threaded hole 49 for receiving a threaded shaft 50 that may be connected to a reversing motor 51 through a universal joint 52 and a speed reducer 53. The reversing motor 51 may be controlled from a timer control that may be set to vary the rotation of the basket 17 in accordance with a desired cycle. With the apparatus in the condition shown in FIG. 2, the basket 17 is rotating at extracting speed. Energizing motor 51 to cause it to rotate in the correct direction will move the arms 34, 35 clockwise (FIG. 1), thereby reducing the speed of basket 17 to its slow speed.

Referring to FIG. 2, the centers of the V-grooves of pulleys 28 and 30 remain in separate, fixed, parallel spaced planes through the range of speed adjustment. In order to maintain the longitudinal centerlines of belts 46 and 47 within these planes during the speed adjustment, a follower bar 54 may be fixed to the arm by bolts 55. The bar 54 may have a predetermined angular relation, and it may slide within a cam yoke 56 that is fixed to a bracket 57 mounted on the base 26. The construction and arrangement of the yoke 56 and bar 54 are such that during oscillatable movement of the arms 34 and 35, the entire assembly including said arms and shaft 33 slides axially in bearings 32 in a manner to positively maintain the longitudinal centerlines of belts 46 and 47 within the planes including the V's of the pulleys 28 and 30.

Although the various features of the new and improved variable speed drive for laundry machines have been shown and described in detail to fully disclose one embodiment of the invention, it will be evident that changes may be made in such details and certain features may be used without others without departing from the principles of the invention.

What is claimed is:

1. In a variable speed belt drive, a base; a motor mounted on said base and having a constant diameter V-groove pulley means on its output shaft; a driven, constant diameter V-groove pulley means on said base; expansible pulley means journaled on arm means pivoted to said base intermediate said motor and driven pulley means; relatively narrow V-belt means connecting said motor pulley means to said expansible pulley means; relatively wide V-belt means connecting said driven pulley means to said expansible pulley means; means for oscillating said arm means to vary the rate of rotation of said driven pulley means; and means for sliding said arm means transversely of the longitudinal centerlines of said V-belts during its oscillation.

2. In a variable speed belt drive, a base; a motor mounted on said base and having a relatively small, constant diameter V-groove pulley means on its output shaft; a driven, relatively large, constant diameter V-groove pulley means mounted on said base; expansible pulley means mounted on a shaft journaled in ball bearings on arm means pivoted to said base intermediate said motor and driven pulley means; relatively narrow V-belt means connecting said motor pulley means to said expansible pulley means; relatively wide V-belt means connecting said driven pulley means to said expansible pulley means; means for oscillating said arm means to vary the rate of rotation of said driven pulley means; and means for sliding said arm means transversely of the longitudinal centerlines of said V-belts during its oscillation.

3. In a variable speed belt drive, a base; a motor mounted on said base and having a constant diameter V-groove pulley means on its output shaft, and having the bottom of its V within a stationary plane transverse to the axis of said shaft; a driven, constant diameter V-groove pulley means mounted on a shaft on said base and having the bottom of its V within a stationary plane transverse to its shaft; expansible pulley means journaled on arm means pivoted to said base intermediate said motor and driven pulley means; relatively narrow V-belt means connecting said motor pulley means to said expansible pulley means; relatively wide V-belt means connecting said driven pulley means to said expansible pulley means; means for oscillating said arm means to vary the rate of rotation of said driven pulley means; and means for sliding said arm means transversely of said planes during the oscillation thereof.

4. In a variable speed belt drive, a base; a motor mounted on said base and having a constant diameter V-groove pulley means on its output shaft, and having the bottom of its V within a stationary plane transverse to the axis of said shaft; a driven, constant diameter V-groove pulley means mounted on a shaft on said base and having the bottom of its V within a stationary plane transverse to its shaft; expansible pulley means mounted on a shaft journaled in ball bearings on arm means pivoted to said base intermediate said motor and driven pulley means; relatively narrow V-belt means connecting said motor pulley means to said expansible pulley means; relatively wide V-belt means connecting said driven pulley means to said expansible pulley means; means for oscillating said arm means to vary the rate of rotation of said driven pulley means; and means for sliding said arm means transversely of said planes during the oscillation thereof.

5. In a variable speed belt drive, a base; a motor mounted on said base and having a constant diameter V-groove pulley means fixed to its output shaft; a driven, constant diameter V-groove pulley means mounted on said base in spaced relation to said motor; a shaft journaled in bearings on said base and arranged for axial movement within said bearings, said shaft being transversely arranged relative to planes of rotation of said V-groove pulleys; radially aligned arms fixed to said shaft; another shaft parallel to said transverse shaft and journaled in aligned ball bearings at the end of said arms opposite those connected to said axially movable shaft; differential expansible V-groove pulley means mounted on said other shaft; V-belt means connecting said differential pulley means to said constant diameter pulley means; means for oscillating said arms; and means for axially sliding the shaft that supports said arms during said oscillation.

6. In a variable speed belt drive, a base; a motor mounted on said base and having a constant diameter V-groove pulley means fixed to its output shaft; a driven, constant diameter V-groove pulley means mounted on said base in spaced relation to said motor; a shaft journaled in bearings on said base and arranged for axial movement within said bearings, said shaft being transversely arranged relative to planes of rotation of said V-groove pulleys; radially aligned arms fixed to said shaft; another shaft parallel to said transverse shaft and journaled in aligned ball bearings at the end of said arms opposite those connected to said axially movable shaft; differential expansible V-groove pulley means mounted on said other shaft; relatively narrow V-belt means connecting said motor pulley to said differential pulley means; relatively wide V-belt means connecting said driven pulley means with said differential pulley means; means for oscillating said arms; and means for axially sliding the shaft that supports said arms during said oscillation.

References Cited in the file of this patent

UNITED STATES PATENTS

| | | |
|---|---|---|
| 2,202,384 | Jacobsen | May 28, 1940 |
| 2,695,529 | Evans | Nov. 30, 1954 |
| 2,852,951 | Miner | Sept. 23, 1958 |
| 2,885,897 | Pettigrew | May 12, 1959 |
| 2,920,493 | Pinder | Jan. 12, 1960 |
| 2,942,447 | Rickel et al. | June 28, 1960 |